United States Patent [19]

Bickford

[11] Patent Number: 4,982,910
[45] Date of Patent: Jan. 8, 1991

[54] COILABLE TAPE RULE WITH IMPROVED CONNECTION BETWEEN SPRING AND HUB

[75] Inventor: Dudley V. Bickford, Chester, Conn.

[73] Assignee: The Stanley Works, New Britain, Conn.

[21] Appl. No.: 424,383

[22] Filed: Oct. 20, 1989

[51] Int. Cl.$^5$ .................. B65H 75/48; G01B 03/10
[52] U.S. Cl. ..................... 242/107; 242/74; 242/74.1
[58] Field of Search .............. 242/107, 107.3, 74, 242/74.1, 84.8; 33/756–769

[56] References Cited

U.S. PATENT DOCUMENTS

| | | |
|---|---|---|
| 2,080,815 | 5/1937 | Gasstrom . |
| 2,510,939 | 6/1950 | Carlson . |
| 2,614,769 | 10/1952 | Nicholson . |
| 2,673,694 | 3/1954 | Howell . |
| 2,760,733 | 8/1956 | Harris et al. . |
| 3,114,515 | 12/1963 | Kane . |
| 3,141,628 | 7/1964 | Evans et al. . |
| 3,261,100 | 7/1966 | Quenot . |
| 3,713,603 | 1/1973 | Shore .................. 33/761 X |
| 3,716,201 | 2/1973 | West . |
| 4,068,383 | 1/1978 | Krebs . |
| 4,398,679 | 8/1983 | Kluczynski et al. .......... 242/74 |
| 4,434,952 | 3/1984 | Czerwinski et al. . |
| 4,487,379 | 12/1984 | Drechsler et al. . |
| 4,506,843 | 3/1985 | Lührig et al. ............... 242/74 |
| 4,583,294 | 4/1986 | Hutchins et al. . |
| 4,663,854 | 5/1987 | Miller et al. . |

Primary Examiner—Stuart S. Levy
Assistant Examiner—Steven M. duBois

[57] ABSTRACT

A power returnable tape rule has an improved connection between the inner end of the power spring and the hub. The hub has an axially elongated passage therethrough with shoulders at the axial ends thereof which seat in notches formed in the edges of the spring extending therethrough. These shoulders are located intermediate the transverse dimension of the passage and are inclined upwardly towards the axial ends. Bosses on the opposing wall of the passage limit the clearance in the passage and thereby the opportunity for the spring to be lifted from the shoulders.

7 Claims, 4 Drawing Sheets

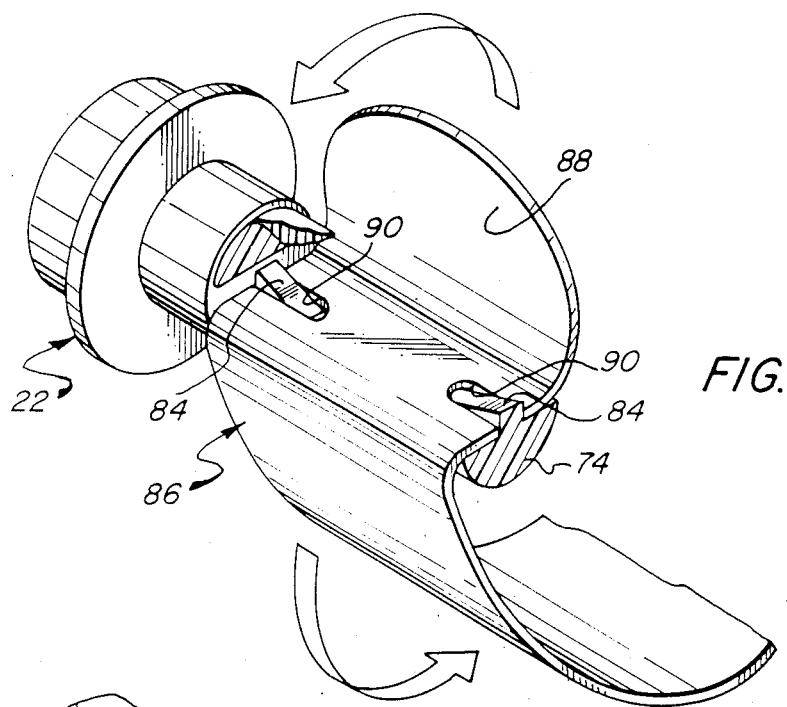
FIG. 11
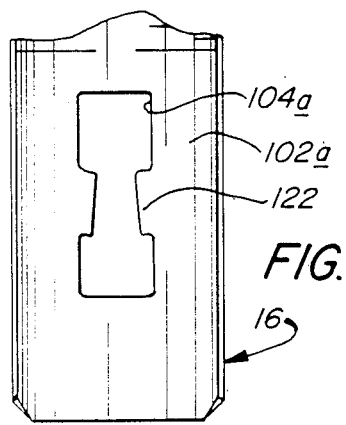
FIG. 12
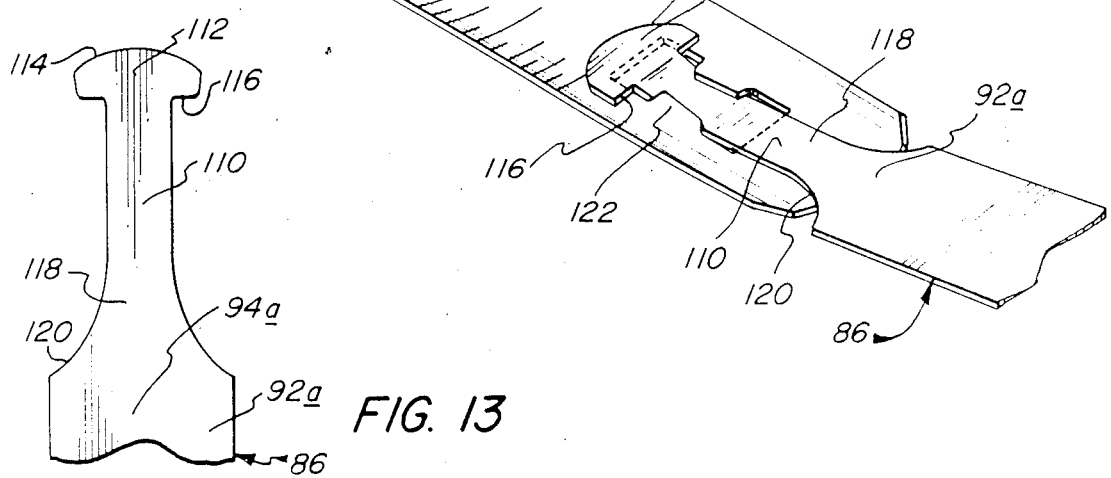
FIG. 13
FIG. 14

COILABLE TAPE RULE WITH IMPROVED CONNECTION BETWEEN SPRING AND HUB

BACKGROUND OF THE INVENTION

The present invention relates to power returnable coilable rules, and more particularly, to connections between the coilable power spring and a fixed hub.

Power returnable coilable rules have enjoyed considerable success in the marketplace and are very widely employed. Generally, such rules have a power spring providing the retracting force to draw the metal rule inwardly of the casing and effect its coiling thereabout. In some such rules, the spring operates to effect rotation of a reel to which its outer end is connected, and its inner end is engaged with a fixed hub about which the reel rotates. In some instances, the projecting end of the spring is bend about the hub to secure it thereto.

Since there are substantial forces exerted upon the connection of the spring to the hub, it is desirable that there be a positive engagement therebetween to locate the spring in a fixed position relative to the hub and essentially to preclude inadvertent disengagement.

It is an object of the present invention to provide an improved power returnable coilable metal rule in which there is a novel and secure interengagement between the inner end of the spring and the hub about which the reel rotates.

It is also an object to provide such a coilable metal rule in which the elements may be economically fabricated and readily assembled to provide such secure engagement between the rule and spring and the hub.

Another object is to provide such a coilable rule in which the end of the spring is precisely positioned relative to the hub.

Still another object is to provide such a coilable rule in which the hub and power spring may be readily assembled by automated procedures.

SUMMARY OF THE INVENTION

It has now been found that the foregoing and related objects may be readily attained in a power returnable tape rule having a case with an exit aperture in the peripheral wall thereof, an elongated spring coiled therewithin, an elongated tape rule blade coiled thereabout with its outer end extending outwardly of the exit aperture and its inner end secured to the outer end of the coiled elongated spring, and a hub with which the inner end of the spring is engaged by an improved connection. The hub has an axially elongated transverse passage therethrough with axially extending shoulders at each axial end of the passage, and the spring has its inner end portion passing through the passage with opposed notches therein seating the shoulders to engage the spring in the passage.

Preferably, one of the axially extending walls of the hub defining the passage has the shoulders formed thereon and the other axially extending wall has bosses thereon reducing the unobstructed spacing between the walls.

Desirably, the shoulders are of narrow width relative to, and intermediate the transverse dimension of the passage, and they are inclined upwardly towards the adjacent axial end of the passage. The portion of the inner end of the spring which extends beyond the hub is bent about the hub.

BRIEF DESCRIPTION OF THE DRAWINGS

FIG. 11 is a fragmentary perspective view of the hub and spring as initially assembled with a portion of the hub broken away;

FIG. 12 is a fragmentary plan view of the inner end of a rule blade employing an alternate embodiment of lock configuration;

FIG. 13 is a fragmentary plan view of the outer end of the spring for the alternate embodiment; and FIG. 14 is a fragmentary perspective view of the rule blade and spring as engaged and utilizing the alternate embodiment.

DETAILED DESCRIPTION OF THE ILLUSTRATED EMBODIMENTS

Figure 1:
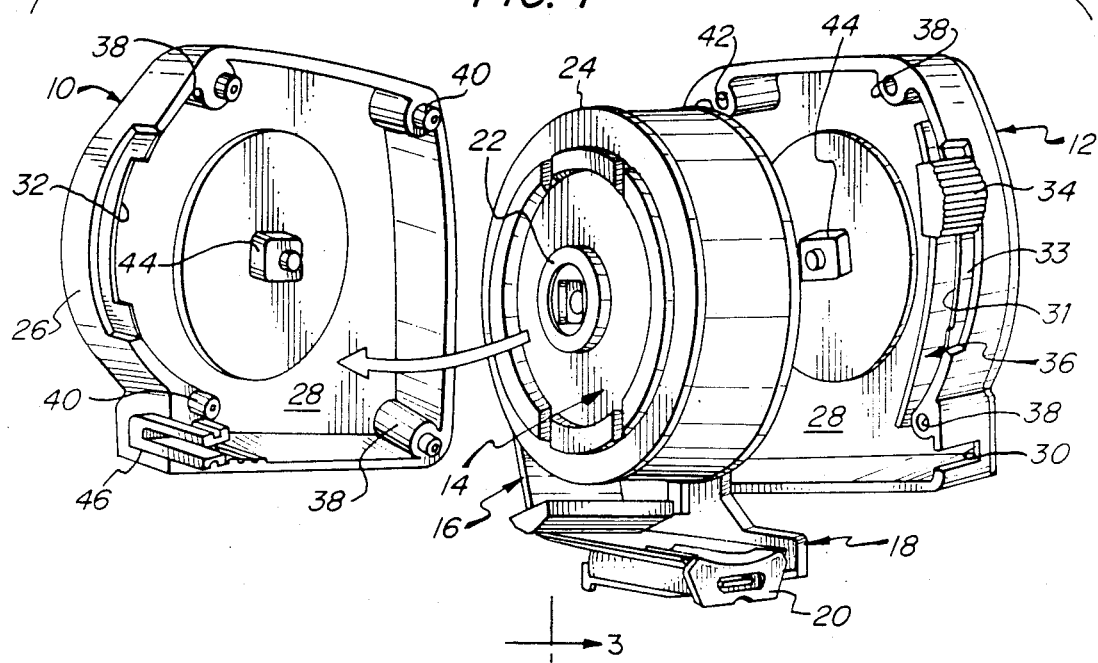
FIG. 1 is a perspective view of the two halves of a rule housing in spaced position, with a cartridge containing a spring and hub joined in accordance with the present invention shown as mounted upon a jig prior to assembly in the housing.

Turning first to FIG. 1 of the attached drawings, therein illustrated is a partially assembled power returnable tape rule embodying the present invention. The case for the rule is comprised of two mating sections generally designated by the numerals 10, 12 and in which is to be seated the cartridge generally designated by the numeral 14. The cartridge 14 includes a coilable metal rule blade generally designated by the numeral 16 extending outwardly therefrom, and the cartridge 14 is seated on the assembly jig generally designated by the numeral 18 with the hook 20 at the outer end of the blade 16 hooked over a surface on the jig 18. The cartridge 14 includes the reel or spool 24 and the hub generally designated by the numeral 22 about which the spring (not shown) is coiled and about which the reel 24 is rotatable.

The case or housing sections 10, 12 each have an end wall 28 and a peripheral wall 26 extending thereabout with an exit aperture 30 adjacent the base portion thereof. Also provided in the end wall 26 above the exit aperture 30 in the section 10 is a notch 32, and the section 12 has a cooperating notch 31 and recessed surface 33. When joined, the notches 31, 32 in the sections 10, 12 together provide a channel in which is slidable the lock button 34 of the lock assembly generally designated by the numeral 36. At spaced points about the case sections 10, 12 are provided aligned bosses 38, and the bosses 38 of the section 10 have projecting pins 40 which seat in mating recesses 42 of the section 12 for engagement to retain the casing halves in alignment. Threaded fasteners (not shown) seat in countersunk apertures in the section 12 and threadably engage in the pins 40 of the section 10 to lock the sections 10, 12 together.

The side wall 28 of each of the case sections 10, 12 has a centrally disposed boss 44 which is cooperatively configured to seat in apertures at the axial ends of the hub 22 to prevent the rotation thereof. Also seen in FIG. 1 is the speed control insert 46 which is secured in the exit aperture 30 and through which the blade 16 extends.

As is well known, the lock assembly 36 is movable downwardly against the blade 16 within the casing to lock the blade 16 in an extended position. Upon release of the blade 16, it retracts into the casing until the hook 20 at the outer end of the blade 16 abuts the walls of the speed control insert 46 about the exit aperture 30 to limit its movement inwardly of the casing.

As seen in FIGS. 1-4, the jig 18 includes a base 48 and an upstanding leg 50 which has a rectangular boss 52 on the inner surface of its upper end which seats in the hub 22. A projecting arm 54 adjacent the lower end of the leg 50 extends above the base 48. The extended blade 16 passes about the arm 54 to orient the outer end portion of the blade 16 in a substantially straight path so that the hook 20 will seat against the base 48 in a stable position. As will be pointed out more fully hereinafter, the jig 18 is utilized to mount the cartridge 14 in the casing section 10.

Figure 3:
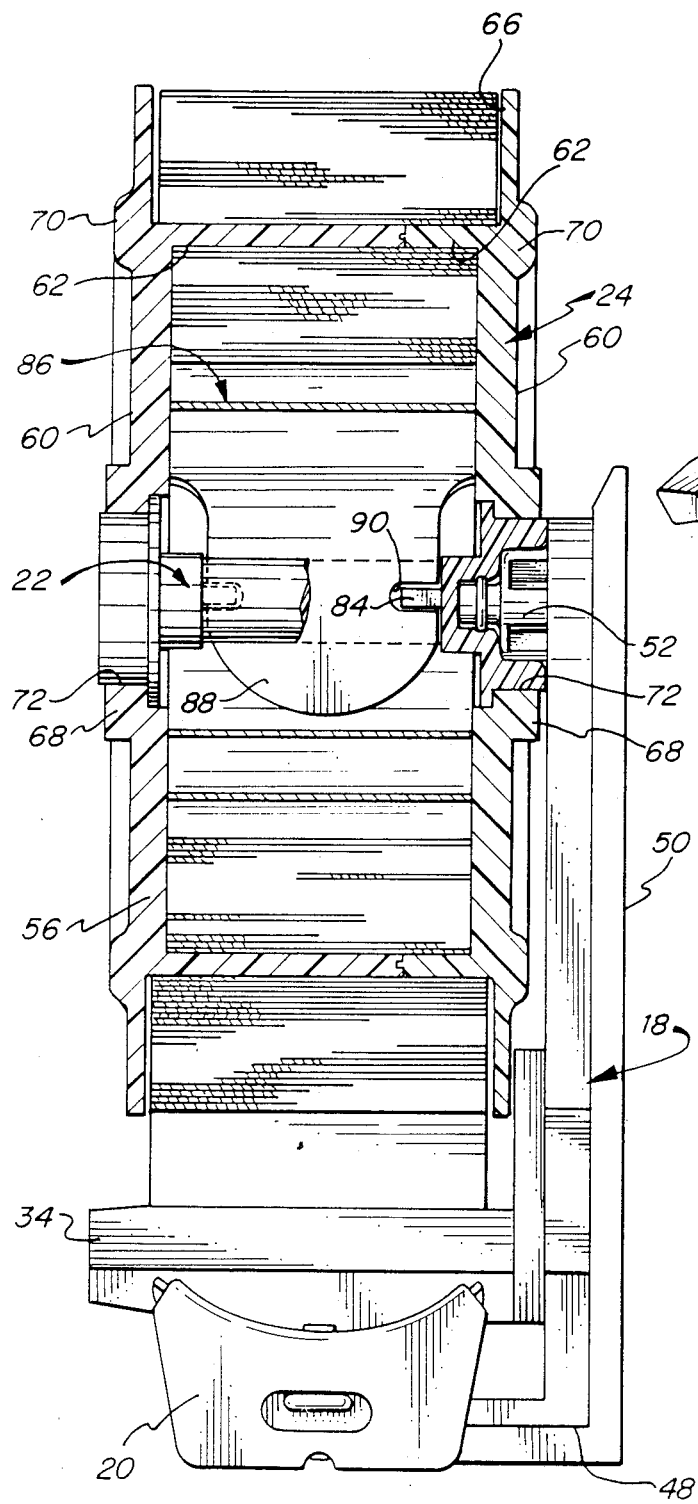
FIG. 3 is a sectional view thereof along the line 3—3 of FIG. 2.
Figure 4:
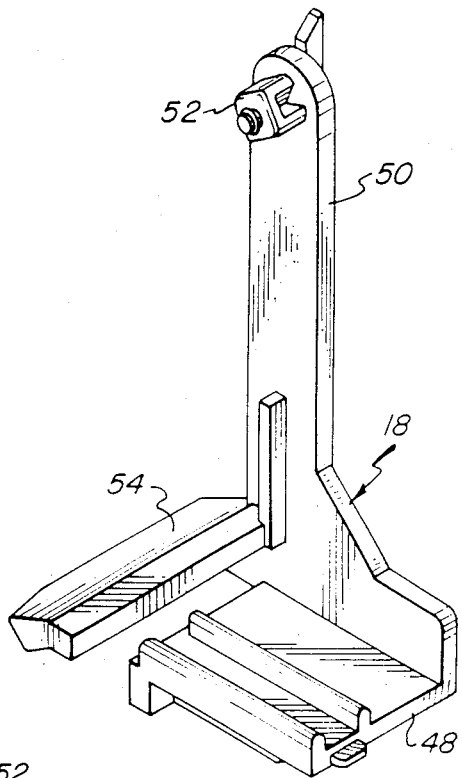
FIG. 4 is a perspective view of the jig seen in FIGS. 1-3.
Figure 5:
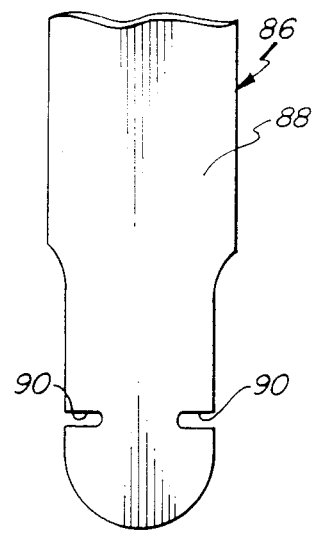
FIG. 5 is a fragmentary plan view of the inner end of the spring.

As seen in FIG. 3, the reel 24 is provided by a pair of mating sections 56, 58 each having a base wall 60 and opposed circular walls 62 spaced inwardly from the margins thereof which abut and define a spring chamber 64 therewithin and a peripheral channel 66 in which the blade 16 is coiled.

The outer surfaces of the base walls 60 have a central boss 68 and an annular boss 70 spaced outwardly therefrom which provide bearing surfaces in the casing, and bores 72 extend through the bosses 68 and walls 60. Rotatably seated in the bores 72 of the sections 56, 58 are the ends of the hub 22.

Figure 6:
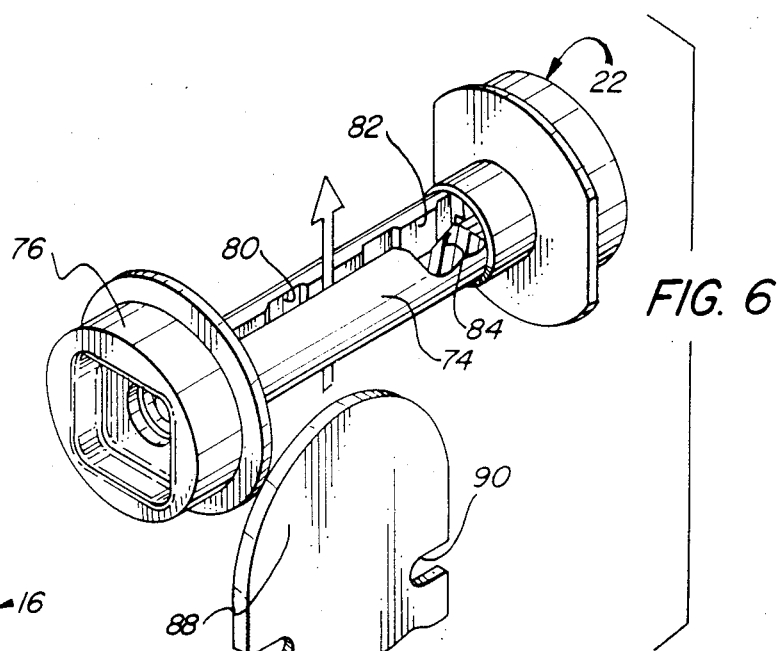
FIG. 6 is a perspective view of the hub shown in FIGS. 1-3 with the end of the fragmentarily illustrated spring shown prior to insertion thereinto.
Figure 7:
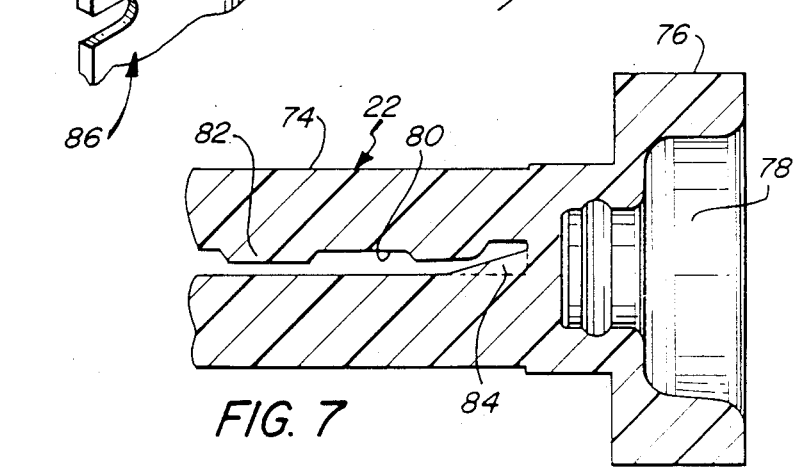
FIG. 7 is a fragmentary sectional view of the hub.

As seen in FIGS. 6 and 7, the hub 22 of the present invention has a generally cylindrical body portion 74 and enlarged end portions 76 providing rectangular recesses 78 in their outer surfaces. As previously indicated, these recesses 78 are cooperatively configured to seat the rectangular bosses 44 on the side walls 28 of the casing sections 10, 12 and prevent its rotation with respect thereto.

The axially extending body portion 74 of the hub 22 has an axially elongated passage 80 therethrough and one of the elongated walls defining the passage is provided with depending bosses 82 spaced along its length. The other of the elongated walls has, at its two ends and generally centrally of the passage 80, a pair of shoulders 84 which are upwardly inclined towards the ends of the passage 80.

As seen in FIG. 3, the coiled power spring generally designated by the numeral 86 has its inner end portion 88 extending through the passage 80 in the hub 22, and the passage 80 is dimensioned with an axial length only slightly larger than the width of the end portion 88. The end portion 88 has a pair of opposed notches or slots 90 which receive the shoulders 84 in the hub passage 80 to accurately position the inner end portion and lock it within the passage 80. The projecting end portion 88 of the spring 86 is bent about the outer surface of the body portion 74 as seen in FIG. 11, and it is of a length which will terminate prior to the other end of the passage 80. Thus, the spring is precisely positioned and its projecting length is fixed by the positioning of the notches 91. The spring 86 is coiled about the hub 22, and its outer end portion 92 extends through a slot (not shown) in the circular walls 62 of the cartridge 24 and is engaged with the blade 16 as will be more fully described hereafter.

Figure 9:
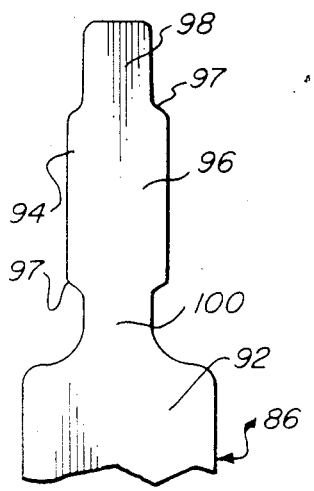
FIG. 9 is a fragmentary plan view of the outer end of the spring.

As seen in FIG. 9, the outer end portion 92 of the spring 86 has an elongated tongue 94 of reduced width with an enlarged portion 96 intermediate its length providing a narrow width section 98 at the outer end and a narrow width section 100 inwardly of the enlarged portion 96. The leading and trailing edges of the enlarged portion 96 are oppositely inclined inwardly and provide shoulders 97.

Figure 8:
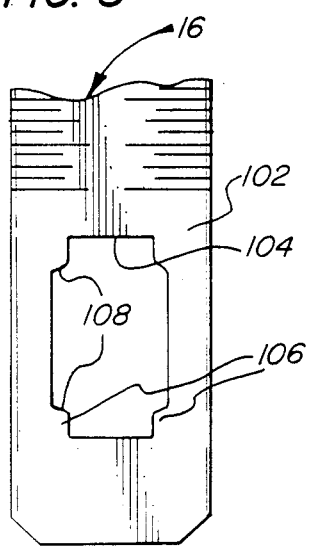
FIG. 8 is a fragmentary plan view of the inner end of the rule blade.

As seen in FIG. 8, the inner end portion 102 of the blade 16 has an elongated aperture 104 therein with an enlarged width portion intermediate its length providing corner tabs 106 with inwardly inclined opposed surfaces 108.

Figure 10:
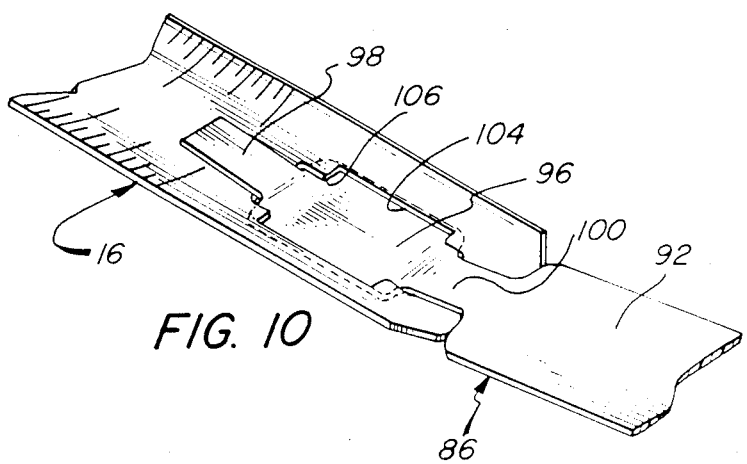
FIG. 10 is a fragmentary view of the spring and rule blade as engaged.

As seen in FIG. 10, in assembling the spring 86 and blade 16, the tongue 94 is placed upon the upper surface of the blade 16 with the enlarged portion 96 overlying the aperture 104. The enlarged portion 96 is pushed downwardly through the aperture 104 and the portions adjacent the shoulders 97 seat under the corner tabs 106 while the sections 98 and 100 extend along the upper surface of the blade 16. It will be appreciated that the inclined surfaces on the tabs 106 and shoulders 97 provide cam surfaces which facilitate the displacement of the enlarged portion 96 through the blade 16.

As will be appreciated, the shoulders 97 abut the wall of the blade 16 defining the ends of the aperture 104 upon relative longitudinal movement in either direction to prevent inadvertent disengagement during normal use.

Turning now to FIGS. 12-14, another embodiment of locking elements is illustrated. The outer end portion 92a of the spring 86 has an elongated tongue 94a with an elongated section 110 of reduced width and an enlarged tip 112 with an arcuate leading edge 114 and generally rectilinear trailing edges 116 providing shoulders. An arcuately tapering section 118 at the inner end of the tongue 94a provides oppositely disposed shoulders 120. The inner end portion 102a of the blade 16 has an elongated aperture 104a with a reduced width portion intermediate its length providing opposed fingers 122.

To assemble this lock as shown in FIG. 14, the narrow portion of the tongue 94a is placed over the aperture 104a, and the tongue 94a is pressed downwardly to flex the fingers 122 downwardly sufficiently to permit the elongated section of the tongue 94a to pass thereby. The fingers 122 then seat thereover to trap the tongue 94a in the aperture 104a. If the spring 86 is moved rearwardly, the shoulders 116 on the trailing edge of the tip will abut the leading edges of the fingers 122 to limit further relative movement. If the spring 86 is moved forwardly the shoulders 120 will abut the trailing edges of the fingers 122 to limit further movement.

As illustrated, the blade 16 desirably has a concavo-convex transverse configuration to increase its stiffness and enable it to stand out from the casing for an extended distance. As the blade 16 is retracted into the casing, the blade is flattened as it enters the casing. The spring 86 is generally of flat transverse configuration as illustrated.

To assemble the rule, the hub is seated in one reel section and the inner end of the spring is inserted into the hub. As it is pressed thereinto, the tapered shoulders flex the edge portions of the spring upwardly to allow them to pass over the shoulders until the notches register therewith, at which time the edge portions are sprung downwardly thereover. This locks the spring on the shoulders in the passage, after which the projecting end portion is bent as seen in FIG. 11. The shoulders and notches ensure proper position of the spring relative to the hub as well as effect locking engagement therebetween. The spring may then be coiled in the spring chamber and the other reel section assembled to secure the spring and hub by sonically or adhesively bonding the reel sections.

Figure 2:
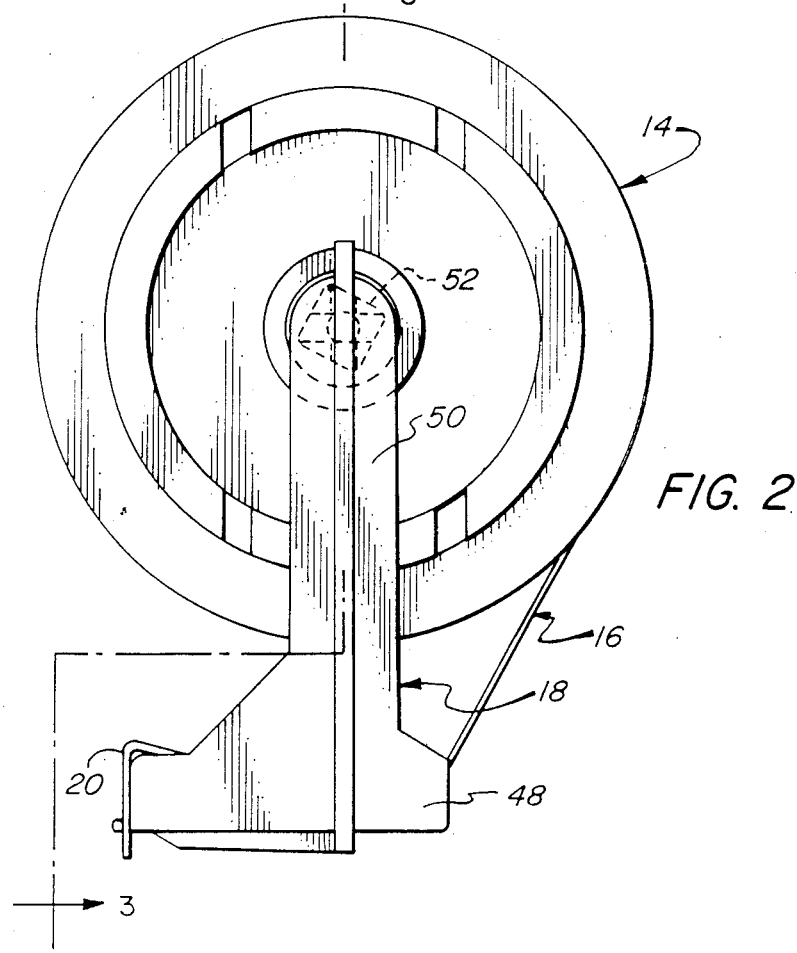
FIG. 2 is an elevational view to an enlarged scale of the cartridge and jig assembly of FIG. 1.

The projecting outer end of the spring is locked into the inner end of the blade which is then coiled about the reel. The cartridge is then seated on the jig with the blade extended to lock the hook over the end of the base as seen in FIGS. 1 and 2, and the case section is rotated 90° and brought thereagainst to seat the hub in its boss and to position the tape hook outwardly of the exit aperture. The jig may then be removed, and the other section of the casing assembled over the cartridge. Each of these operations may be effected on automated equipment to reduce the time and cost of assembly.

In use, the blade is pulled outwardly from the case and the spring tension is increased as this occurs. When the blade is released, the power spring produces rotation of the reel and the coiling of the blade thereon. Even if the spring is loosely coiled about the hub, its inner end is securely engaged with the hub by the seating of the shoulders in the notches.

As is conventional, the spool and hub are molded from synthetic resin, conveniently by injection molding. The resins from which such parts are molded include acrylonitrile/butadiene/styrene interpolymer (ABS), polyamides such as nylon, rubber modified polystyrene (HIPS), styrene/acrylonitrile copolymer (SAN), polypropylene, and the like.

The housing may also be molded from such resins or it may be cast or forged from metal such as aluminum, steel, zinc and brass. The tape and spring will generally comprise tempered steel strip.

Thus, it can be seen that the power returnable tape rules of the present invention may be fabricated from durable components and assembled readily to provide a long lived structure in which the spring and the hub are securely locked in assembly.

Having thus described the invention what is claimed is:

1. In a power returnable tape rule having a case with an exit aperture in the peripheral wall thereof, an elongated spring coiled therewith, and elongated tape rule blade coiled therewithin with its outer end extending outwardly of said exit aperture and its inner end secured to the outer end of the coiled elongated spring, and a hub with which the inner end of said spring is engaged, the improvement comprising an axially elongated transverse passage in said hub, said hub having axially extending shoulders at each axial end of said passage, and said spring having its inner end portion passing through said passage and opposed notches extending inwardly from its side margins seating said shoulders to engage said spring in said passage, said hub passage being configured and dimensioned to cooperate with said shoulders to limit movement of said spring when seated on said shoulders.

2. The power returnable coilable tape rule in accordance with claim 1 wherein one of the axially extending walls of said hub defining said passage has said shoulders formed thereon and the other axially extending wall has bosses thereon reducing the unobstructed spacing between said walls.

3. The power returnable coilable tape rule in accordance with claim 1 wherein said shoulders are of narrow width relative to the transverse dimension of said passage and are inclined upwardly towards the adjacent axial end of said passage.

4. The power returnable coilable tape rule in accordance with claim 3 wherein said shoulders are intermediate the transverse dimension of said passage.

5. The power returnable coilable tape rule in accordance with claim 4 wherein one of the axially extending walls of said hub defining said passage has said shoulders formed thereon and the other axially extending wall has bosses thereon reducing the unobstructed spacing between said walls.

6. The power returnable coilable tape rule in accordance with claim 5 wherein the portion of said inner end of said spring which extends beyond said hub is bent about said hub.

7. The power returnable coilable tape rule in accordance with claim 1 wherein the portion of said inner end of said spring which extends beyond said hub is bent about said hub.

* * * * *